(12) United States Patent
Awad

(10) Patent No.: US 6,485,362 B1
(45) Date of Patent: Nov. 26, 2002

(54) CONCAVE OPTICAL FIBER FERRULE HOLDING PLATE

(76) Inventor: Elias A. Awad, 134 Poplar St., Roslindale, MA (US) 02131

(*) Notice: Subject to any disclaimer, the term of this patent is extended or adjusted under 35 U.S.C. 154(b) by 0 days.

(21) Appl. No.: 09/982,615

(22) Filed: Oct. 19, 2001

(51) Int. Cl.[7] .............................................. B24B 18/00
(52) U.S. Cl. ........................ 451/389; 451/28; 451/41; 451/44; 451/391; 451/392; 385/85
(58) Field of Search ............................ 451/28, 41, 44, 451/51, 66, 389, 391, 392; 385/85

(56) References Cited

U.S. PATENT DOCUMENTS

| | | | |
|---|---|---|---|
| 5,216,846 A | * 6/1993 | Takahashi | 451/57 |
| 5,461,689 A | * 10/1995 | Matsuoka et al. | 385/85 |
| 5,503,590 A | 4/1996 | Saitoh et al. | |
| 5,601,474 A | 2/1997 | Takahashi | |
| 5,640,475 A | 6/1997 | Takahashi | |

* cited by examiner

Primary Examiner—Joseph J. Hail, III
Assistant Examiner—Shantese McDonald

(57) ABSTRACT

A concave optical fiber ferrule holding plate for polishing an end face of an optical fiber is disclosed. The holding plate may be used alone for hand polishing or be provided as a component of an optical fiber polishing machine. The circular holding plate comprises a concave interior with one or more concentric wear rings disposed radially inwardly on said interior from the outer periphery of the holding plate to a point surrounding the optical fiber ferrule located in the center. The holding plate contacts a polishing material only at the peripheral wear ring thereby reducing contamination from the material of the holding plate which reduces contamination of the end face of the fiber during polishing. The degree of deterioration of the wear rings can be easily observed to determine when the ferrule holding plate must be replaced. Furthermore, the measuring of the deterioration of the wear rings allows for monitoring of the orientation or tilt of the holding plate, which is required for proper polishing of the optical fibers. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

17 Claims, 4 Drawing Sheets

CONCAVE OPTICAL FIBER FERRULE HOLDING PLATE

BACKGROUND OF THE INVENTION

1. Field of the Invention

The present invention relates to an optical fiber ferrule holding plate suitable for polishing an optical fiber end surface and method for polishing the same.

2. Description of the Related Art

There have been proposed many optical fiber end surface-polishing apparatuses. Optical fiber polishing apparatuses are configured to hold an optical fiber ferrule in an optical fiber ferrule holding plate, and cause relative movement based on a circular motion between a polishing board and the distal end of the optical fiber ferrule, thereby polishing the distal end of the optical fibers.

A typical ferrule holding plate which can be used in the optical fiber end polishing apparatus stated above is illustrated in FIG. 1. FIG. 1 is a cross-sectional view showing the details of a ferrule holding plate 3 with a single optical fiber attached. Holding plate 3 includes a ferrule receiving cylindrical bushing mounting member 8, which includes a through hole 7 through its center. Ferrule 5 is inserted through hole 7. An external screw thread 8A is provided on the outer periphery of mounting member 8. A box nut 9 is provided with a slit 10, and has an internal thread which engages with the external thread 8A so as to tighten and fit the optical fiber and ferrule onto the cylindrical bushing mounting member 8. As illustrated in FIG. 1, the distal end of ferrule 5 with optical fiber 6 contained therein must be aligned at a predetermined inclination angle to the axis of rotation of the polishing material 11. During polishing operations the end face of the ferrule to be polished is pressed perpendicularly against the polishing surface 11, and the ferrule is rotated to the left and right around its own axis. The polishing surface is indented by the pressure of the ferrule, so that the end face is polished almost spherically in accordance with the curvature of the indentation in the polishing surface. The radius of indentation in the polishing surface, and hence the curvature of the polished end face, can be adjusted by the pressure on the ferrule during polishing. It is well known that the squareness or an error in the tilt angle of the end surface of a polished ferrule with an optical fiber, with respect to a central axis seriously affects the connecting performance of the optical fiber connector. Therefore, it is necessary to set a constant relative distance between the end faces of ferrules and the polishing surface to prepare precise convex-curved surfaces uniformly. A ferrule extending too far beyond the surface of its holding plate has a tendency to wobble which seriously affects the required preciseness of the convex curved surfaces. This problem is further exemplified when the ferrule holding plate is utilized during hand polishing operations. The typical ferrule holding plate, as described above, has a flat base surface 1. For proper hand polishing the ferrule end face should extend a sufficient distance beyond base surface 1 of holding plate 3 so as to deform the polishing surface. The extent of the deformation is determined by the requirements of the particular application. During polishing, base surface 1 of the holding plate 3 will come into contact with the polishing surface 11. In fact, the holding plate 3 will come into contact with the polishing surface 11 even when the holding plate is utilized during machine polishing operations. When polishing an optical fiber end the bottom surface of the holding plate wears down and releases debris as it contacts the polishing material. This debris contaminates the polishing material and reduces the quality of the polished fiber end face. Also, holding plates that lock a ferrule in place do not allow the ferrule to float or back off as the holding plate wears. This in turn will cause an increase in pressure between the end face of the fiber and the polishing material which will ultimately damage the end face of the fiber. Another problem associated with the flat base type holding plates described above is their inability to measure the degree of degradation or wear on the holding plate. If the pressure to the holding plate is applied unevenly during use, the plate may ware unevenly. This will affect the required perpendicularity relative to the polishing material for Physical Contact (PC) and Ultra Physical Contact (UPC) connectors or the 8 degree angle for Angled Physical Contact (APC) connectors. This uneven wear reduces the operating life of the holding plate and also affects the quality of the fiber optic end face.

SUMMARY OF THE INVENTION

It is an object of the present invention to provide an optical fiber ferrule holding plate for hand polishing optical fibers and for utilization in an optical fiber end polishing machine that is capable of achieving further improvement in durability and workability.

It is a further object of the present invention to provide a ferrule holding plate that will minimize the contact surface between the holding plate and polishing material during polishing thereby reducing the amount of contaminants from the holding plate which will enhance the polishing quality and extend the operating life of the polishing material.

It is still a further object of the present invention to provide a means of measuring the wear of the holding plate for determining if the required orientation of the plate is maintained, and for determining when the holding plate must be replaced.

To this end, a concave optical fiber ferrule holding plate for polishing an end face of an optical fiber is disclosed. The holding plate may be used alone for hand polishing or multiple holding plates may be integrated into a single plate array for use in an optical fiber polishing machine. The circular holding plate comprises a concave interior with one or more concentric wear rings disposed radially inwardly on said interior from the outer periphery of the holding plate to a point surrounding the optical fiber ferrule located in the center. The holding plate contacts a polishing material only at the peripheral wear ring thereby reducing contamination from the material of the holding plate which reduces contamination of the end face of the fiber during polishing. The degree of deterioration of the wear rings can be easily observed to determine when the ferrule holding plate must be replaced. Furthermore, the measuring of the deterioration of the wear rings allows for monitoring of the orientation or tilt of the holding plate, which is required for proper polishing of the optical fibers.

DESCRIPTION OF PREFERRED EMBODIMENT

Figure 1:
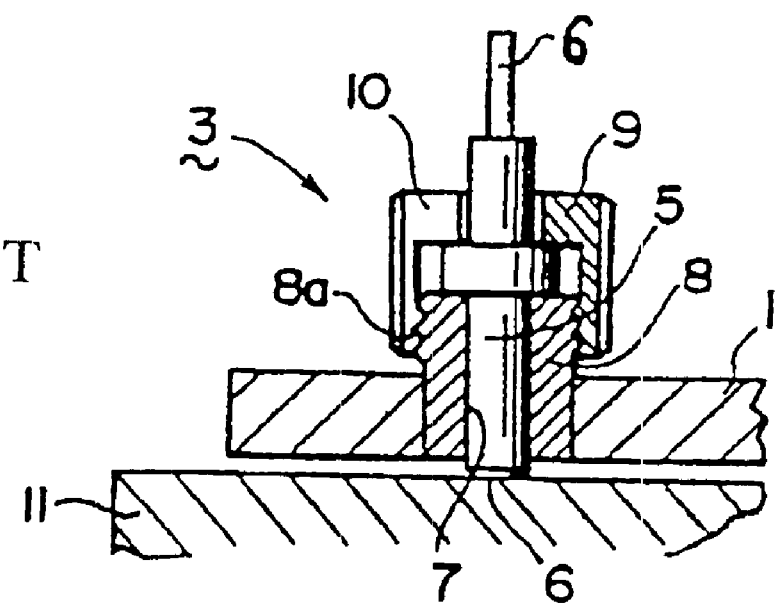
FIG. 1 is a cross-sectional view of a prior art optical fiber ferrule holding plate.
Figure 2:
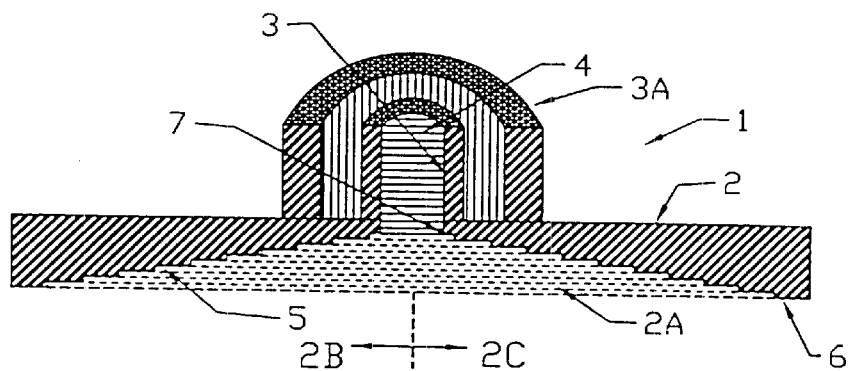
FIG. 2 is a cross-sectional view of the optical fiber holding plate of the present invention.
Figure 3:
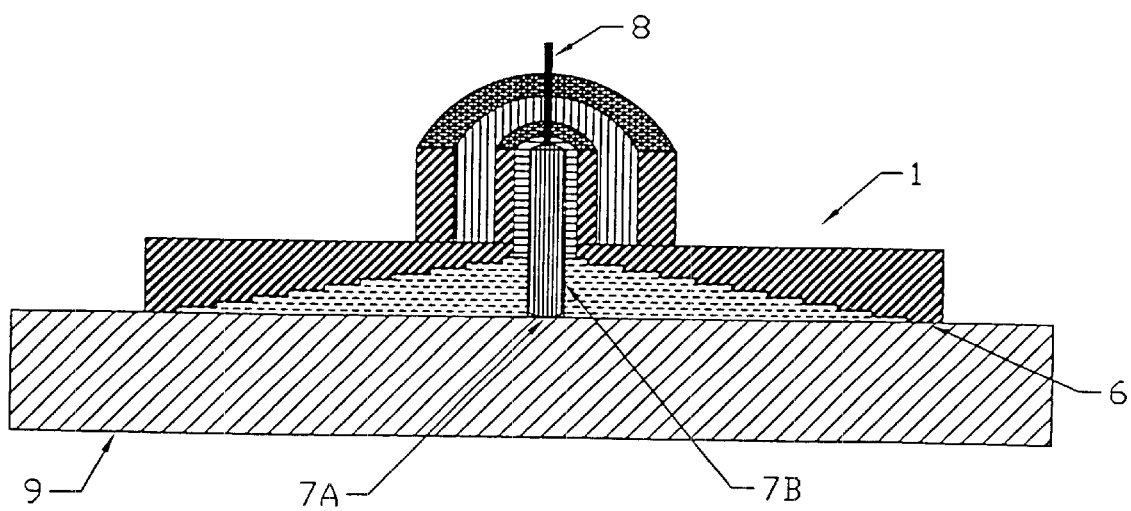
FIG. 3 is a cross-sectional view of the optical fiber holding plate of the present invention resting on a polishing material.
Figure 4:
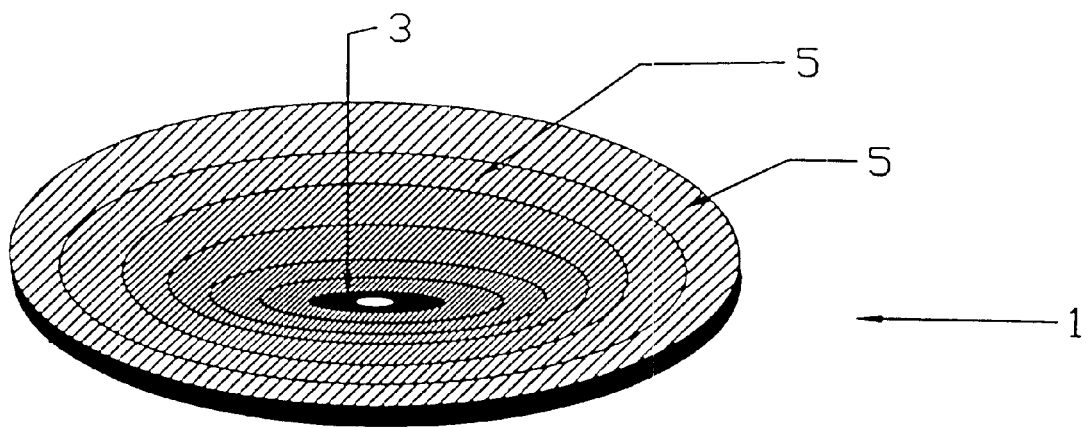
FIG. 4 is a bottom view of the concave interior of the optical fiber holding plate of the present invention.
Figure 5:
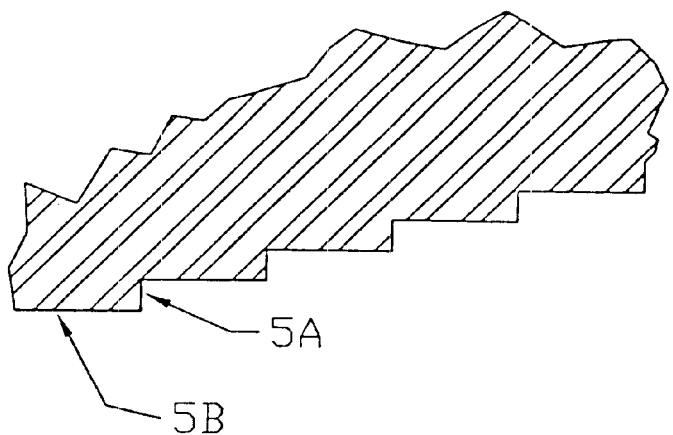
FIG. 5 is an enlarged view of the wear rings of FIG. 2 and FIG. 3.

The optical fiber ferrule holding plate of the present invention will be described with reference to FIG. 2. Referring to the cross-sectional illustration of FIG. 2, an optical fiber ferrule holding plate 1 is disclosed. The holding plate 1 is machined from 303 stainless steel, or equivalants thereof, and comprises a circular base section 2, with a concave interior 2A, and a circular ferrule receiving section 3. The ferrule receiving section 3 extends through the center of concave interior 2A and has a ferrule-inserting hole 4 disposed therein. To aid in description of subject invention the cross-sectional illustration of FIG. 2 has a left side 2B and a right side 2C. The receiving section 3 annularly projects concentrically outward from the center of concave interior 2A to a point above base section 2. A surrounding section 3A, located above base section 2 may be added to aid in the holding of holding plate 1 during hand polishing or be used in securing holding plate 1 within a polishing machine. This section 3A surrounds receiving section 3 and annularly projects concentrically outward to a point above base section 2. In the preferred embodiment the bottom of receiving section 3 is flush with the center of concave interior 2A. However, the bottom of receiving section 3 may extend into concave interior 2A a distance short of outer peripheral wear ring 6. The interior 2A comprises one or more concentric wear rings 5 disposed radially inwardly from the outer peripheral wear ring 6 of holding plate 1 to a point 7 flush with and surrounding ferrule receiving section 3. FIG. 4 is a bottom view of holding plate 1 illustrating concave interior 2A. FIG. 5 illustrates the wear rings having a height 5A and a width 5B. FIG. 5 further illustrates wear rings 5 disposed at a 90-degree angle between height 5A and width 5B. However, other angular configurations may be used as long as it is possible to measure the amount of deterioration of rings 5 by either visual inspection or by the use of a micrometer. Typically, the height of the wear rings 5 will be approximately 10 to 25micrometers with the width being approximately 1 millimeter to 5 millimeters. FIG. 3 illustrates a ferrule 7B containing an optical fiber 8 disposed within ferrule inserting hole 4. The ferrule may be secured in ferrule inserting hole 4 by screw means or other means known in the art that will allow for adding and removing ferrules to and from holding plate 1.

Figure 6:
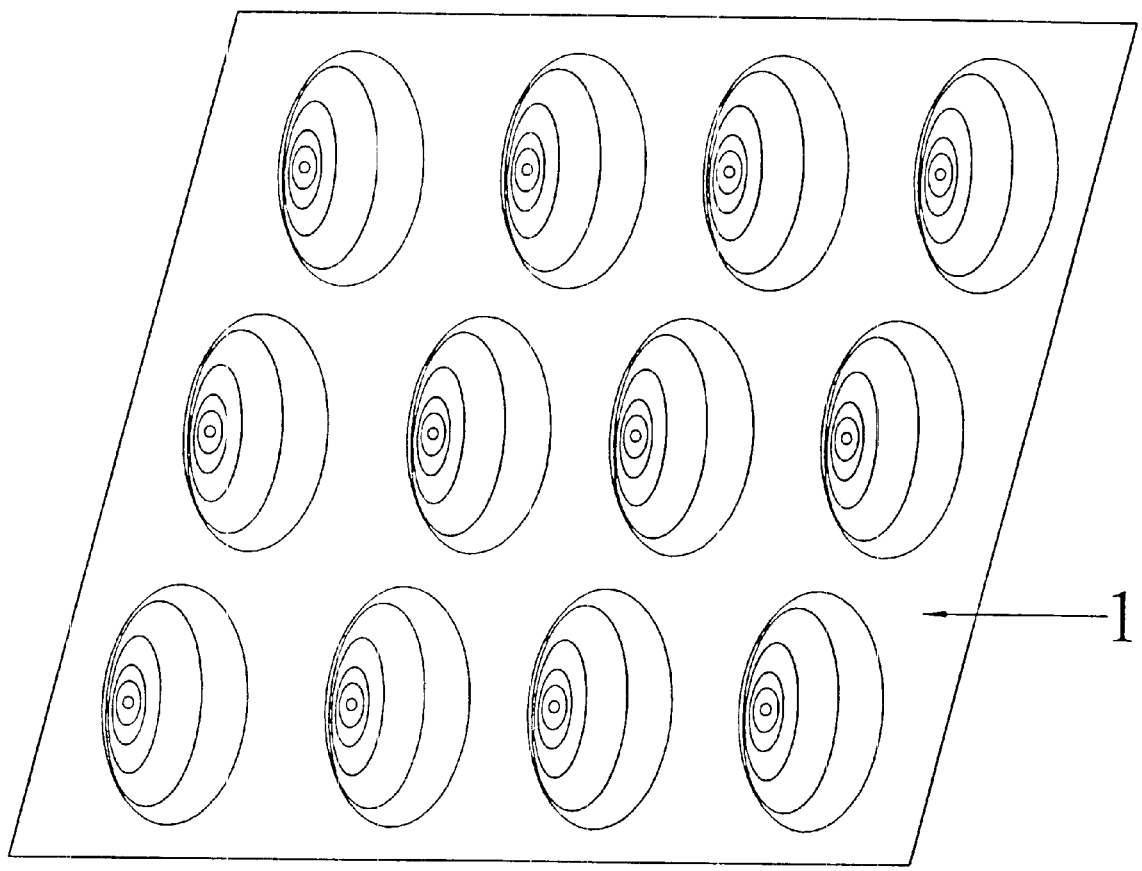
FIG. 6 is a bottom view of a holding plate array.

When polishing an optical fiber end face 7A the outer peripheral wear ring 6 of holding plate 1 contacts the polishing material 9. This contact causes the material of the holding plate 1, at outer peripheral wear ring 6, to degrade or wear down during polishing. Ferrule 7B containing optical fiber 8 is positioned within ferrule inserting hole 4 so that optical fiber end 7A makes contact with polishing material 9. This occurs when holding plate 1 sits on polishing material 9 as illustrated in FIG. 3. The ferrule 7B should extend a sufficient distance beyond the bottom of ferrule receiving section 3 such that ferrule end face 7A deforms the polishing material 9. The extent of deformation is determined by the requirements of the particular application. The holding plate 1 is moved either by machine or by hand over the polishing material 9. When machine polishing multiple fibers at once, multiple holding plates 1 may be integrated into a single plate array as illustrated in FIG. 6. In the preferred embodiment the holding plates are machined into the plate array resulting in a one piece structure. However, it should be understood that a plate array could be formed by inserting separate holding plates into a plate array. This structure would allow for the removal/replacement of particular holding plates when necessary. This array may take on different forms depending on the type of polishing machine utilized. The deterioration or wear of holding plate 1 can be determined by counting the number of wear rings on left side 2B and right side 2C. If the number of wear rings 5 are different an adjustment can be made to apply even pressure to holding plate 1 during polishing. When proper pressure is applied, both sides 2B and 2C of holding plate 1 will wear at the same rate resulting in the same number of wear rings on both sides 2B and 2C.

Since the holding plate 1 of the present invention contacts the polishing material 9 only at the peripheral wear ring 6 the contact surface between the holding plate 1 and polishing material is reduced by more than 95%. Furthermore, the debris removed from the holding plate during polishing is isolated at the peripheral wear ring 6. By limiting the range of motion of the holding plate during polishing we can ensure that the optical fiber end face 7A will not encounter the debris removed from the holding plate during polishing. This limited range of motion is defined as movement of the holding plate 1 such that optical fiber end face 7A does not contact polishing material 9 at any point where peripheral wear ring 6 has made contact with the polishing material 9.

While preferred embodiments of the invention have been shown for purposes of illustration, it will be apparent to those skilled in the art that various modifications can be made falling within the spirit of the invention and the true scope of the appended claims.

I claim:

1. An optical fiber ferrule holding plate used in polishing the tip end surface of an optical fiber into a spherical shape, the optical fiber being supported by a ferrule, the holding plate comprising:

A circular base, said circular base including a concave interior; said circular base further including a ferrule receiving section, said receiving section disposed at the center of said concave interior, said concave interior further including a plurality of ring areas, said ring areas disposed radially inward from the outer periphery of said concave interior to a point surrounding said optical fiber ferrule.

2. An optical fiber ferrule holding plate according to claim 1 wherein said ferrule receiving section further includes a means for detachably holding said ferrule within said ferrule receiving section.

3. An optical fiber ferrule holding plate according to claim 1, wherein said ferrule receiving section annularly projects concentrically outward from said center of said circular base.

4. An optical fiber ferrule holding plate according to claim 1 wherein each of said plurality of ring areas are defined by a height and a width.

5. An optical fiber ferrule holding plate according to claim 4 wherein the angle between said height and said width of each of said plurality of ring areas is ninety degrees.

6. An optical fiber ferrule holding plate of claim 4 wherein the angle between said height and said width of each of said plurality of ring areas is any angle which allows for the measurement of the deterioration of the height of said ring area by visual inspection or by the use of a micrometer.

7. An optical fiber ferrule holding plate of claim 4 wherein said height of each of said plurality of ring areas is between approximately 10 to approximately 25 micrometers and said width of each of said plurality of ring areas is between approximately 1 millimeter to approximately 5 millimeters.

8. An apparatus for simultaneously polishing a plurality of optical fibers against a polishing material, the tip end surfaces of the optical fibers contained in a plurality of optical fiber ferrules, comprising:

a plate array having a plurality of holding plates, each of said holding plates comprising a circular base, said circular base including a concave interior, said circular base further including a ferrule receiving section, said receiving section disposed at the center of said concave interior, said concave interior further including a plurality of ring areas, said ring areas disposed radially inward from the outer periphery of said concave interior to a point surrounding said optical fiber ferrule, each of said holding plates integrated within said plate array.

9. An optical fiber ferrule holding plate used in polishing the tip end surface of an optical fiber into a spherical shape, the optical fiber being supported by a ferrule, the holding plate comprising:

A circular base, said circular base including a concave interior, said circular base further including a ferrule receiving section, said receiving section disposed at the center of said concave interior, said concave interior further including a ring area, said ring area disposed at the outer periphery of said concave interior.

10. An optical fiber ferrule holding plate according to claim 9 wherein said ferrule receiving section further includes a means for detachably holding said ferrule within said ferrule receiving section.

11. An optical fiber ferrule holding plate according to claim 9, wherein said ferrule receiving section annularly projects concentrically outward from said center of said circular substrate.

12. An optical fiber ferrule holding plate according to claim 9 wherein said ring area is defined by a height and a width.

13. An optical fiber ferrule holding plate according to claim 12 wherein the angle between said height and said width is ninety degrees.

14. An optical fiber ferrule holding plate of claim 12 wherein the angle between said height and said width of said ring area is any angle which allows for the measurement of the deterioration of the height of said ring area by visual inspection or by the use of a micrometer.

15. An optical fiber ferrule holding plate of claim 12 wherein said height of said ring area is between approximately 10 to approximately 25 micrometers and said width of said ring area is between approximately 1 millimeter to approximately 5 millimeters.

16. A method of polishing an optical fiber end surface comprising the steps of:

providing a polishing material;

providing an optical fiber ferrule holding plate, said holding plate comprising a circular base, said circular base including a concave interior, said circular base further including a ferrule containing an optical fiber, said optical fiber disposed at the center of said circular base and extending through the center of said concave interior, said optical fiber end surface making contact with said polishing material, said concave interior further including a plurality of ring areas, said ring areas disposed radially inward from the outer periphery of said concave interior to a point surrounding said optical fiber ferrule;

pressing said optical fiber ferrule holding plate against said polishing material, said holding plate making contact with said polishing material at said periphery of said concave interior, causing a relative movement between said optical fiber end surface and said polishing material;

restricting said movement of said optical fiber end surface such that said optical fiber end surface does not contact said polishing material at any point where said periphery of said concave interior has made contact with said polishing material.

17. A method of polishing an optical fiber according to claim 16 further including the step of measuring the deterioration of said peripheral ring areas to determine when said holding plate must be replaced.

* * * * *